US012600295B2

(12) United States Patent
Lin et al.

(10) Patent No.: US 12,600,295 B2
(45) Date of Patent: Apr. 14, 2026

(54) LIGHTING ASSEMBLY HAVING A LIGHT TRANSMITTING FILM ATTACHED TO A DECORATIVE COMPONENT AND LIGHT GUIDE WITH REFLECTIVE INFORMATION STRUCTURE

(71) Applicant: SILITECH TECHNOLOGY CORP., New Taipei (TW)

(72) Inventors: Yen-Chih Lin, New Taipei (TW); Long-Jyh Pan, New Taipei (TW); Chinyi Chou, New Taipei (TW)

(73) Assignee: SILITECH TECHNOLOGY CORP., New Taipei City (TW)

( * ) Notice: Subject to any disclaimer, the term of this patent is extended or adjusted under 35 U.S.C. 154(b) by 0 days.

(21) Appl. No.: 19/061,507

(22) Filed: Feb. 24, 2025

(65) Prior Publication Data

US 2026/0001480 A1      Jan. 1, 2026

(51) Int. Cl.
    *B60Q 3/14*        (2017.01)
    *B60Q 3/54*        (2017.01)
    *B60Q 3/64*        (2017.01)
(52) U.S. Cl.
    CPC ................. *B60Q 3/14* (2017.02); *B60Q 3/54* (2017.02); *B60Q 3/64* (2017.02)

(58) Field of Classification Search
    CPC ......... G02B 6/006; G09F 21/049; B60Q 3/14; B60Q 3/54; B60Q 3/64; B60Q 3/66; F21W 2106/00
    See application file for complete search history.

(56) References Cited

U.S. PATENT DOCUMENTS

| | | | |
|---|---|---|---|
| 10,112,533 B2 * | 10/2018 | Yamato | .................... B60Q 3/64 |
| 2009/0219734 A1 * | 9/2009 | Sawada | ................ G02B 6/0076 |
| | | | 362/616 |
| 2024/0053528 A1 * | 2/2024 | Martin | ................. G02B 6/0088 |

* cited by examiner

*Primary Examiner* — Robert J May
(74) *Attorney, Agent, or Firm* — Demian K. Jackson; Jackson IPG PLLC

(57) ABSTRACT

The present invention relates to a lighting assembly. The lighting assembly includes: a first decorative component; a light-transmitting thin film attached to the first decorative component; and a first light guide configured adjacent to the first decorative component and including a first optically reflective information structure attached to the first light guide and including a first information and a first light source emitting a first light, wherein the first light illuminates the first optically reflective information structure and penetrates through the first decorative component and the light-transmitting thin film to render the first information to be displayed on a display surface, when the first light source is activated.

8 Claims, 5 Drawing Sheets

60,200

LIGHTING ASSEMBLY HAVING A LIGHT TRANSMITTING FILM ATTACHED TO A DECORATIVE COMPONENT AND LIGHT GUIDE WITH REFLECTIVE INFORMATION STRUCTURE

CROSS-REFERENCE TO RELATED APPLICATION

This application claims priority benefit to Taiwan Utility Model patent Application Serial No. 113207029, filed on Jul. 1, 2024, in Taiwan Intellectual Property Office, the entire disclosures of which are incorporated by reference herein.

FIELD

The present invention relates to a lighting assembly, in particular to a decorative automotive lighting assembly capable of presenting a transparent crystal-like outer appearance.

BACKGROUND

With the advancement of technology and the increasing demands of consumers, automotive interior design is evolving toward greater diversification, personalization, and aesthetics. In particular, in the era of electric and smart vehicles, interior components must not only meet basic functional requirements, but also consider visual appeal and environmental performance.

On the other hand, consumers have higher expectations for automotive interior components, seeking more refined and personalized decorative effects. As a result, various innovative illuminated interior components have emerged, such as ambient lighting panels, wood grain-inspired illuminated trim/decorative components, and transparent crystal-like center console trim. These components not only create a unique atmosphere in the vehicle, but also enhance the overall visual aesthetics of the vehicle interior.

In addition to aesthetics, consumers are increasingly concerned about the environmental performance of interior components. Traditional automotive decorative lighting elements typically use LED components or incandescent bulbs as light sources, directing light to the locally translucent areas of decorative trim by direct illumination or with the aid of light-directing components. However, such designs have limitations; for example, the illumination pattern is entirely determined by the locally translucent pattern of the decorative trim, which inevitably results in "non-translucent" areas.

To meet consumer demand for transparent illuminated trim, designers must break away from traditional design concepts and continually explore new technological and material solutions. Ideally, a transparent illuminated trim should clearly display the illuminated pattern when the light source is turned on, while the pattern should appear faint or completely invisible when the light source is turned off, creating a crystal-like transparent visual effect. This effect not only enhances the aesthetics of the vehicle interior, but also provides consumers with an impressive visual experience.

In addition, to improve the environmental performance of automotive interior components, designers must consider the use of lighter structures and materials. Lightweight designs can not only reduce energy consumption, but also reduce the overall weight of the vehicle, thereby improving driving efficiency and fuel economy. This approach not only appeals to consumers' environmental awareness, but also provides automakers with greater market competitiveness.

In conclusion, with the development of electric and smart vehicles, automotive interior design technologies must continue to innovate by adopting new technologies and materials to create more aesthetic, environmentally friendly, and personalized interior components. It meets the growing demands of consumers while enhancing the competitiveness of automotive products.

Therefore, there is a need to address the above shortcomings/problems. In view of the shortcomings of conventional technologies, the creator, through diligent efforts and thorough research, has finally conceived the present invention, a lighting assembly, to overcome the aforementioned shortcomings. A brief description of the invention is disclosed below.

SUMMARY

The present invention relates to a lighting assembly, in particular to a decorative automotive lighting assembly capable of presenting a transparent crystal-like outer appearance.

Accordingly, the present invention provides a lighting assembly. The lighting assembly includes: a first decorative component; a light-transmitting thin film attached to the first decorative component; and a first light guide configured adjacent to the first decorative component and including a first optically reflective information structure attached to the first light guide and including a first information and a first light source emitting a first light, wherein the first light illuminates the first optically reflective information structure and penetrates through the first decorative component and the light-transmitting thin film to render the first information to be displayed on a display surface, when the first light source is activated.

Preferably, the lighting assembly further includes one of the following: a decorative module including the first decorative component and the light-transmitting thin film, wherein the light-transmitting thin film is attached to the first decorative component; a light-transmitting cover configured adjacent to the light-transmitting thin film and including the display surface; and a light-emitting information module including a first light-emitting module, wherein the first light-emitting module includes: the first light guide including a first surface, a second surface, a third surface, and a fourth surface; the first light source configured on a circuit substrate and to emit the first light; the first optically reflective information structure configured on the second surface and including the first information and a first-type information; and a touch panel module configured below the first decorative component, wherein the first light enters from the fourth surface to illuminate the first optically reflective information structure and penetrates through the first decorative component, the light-transmitting thin film, and the light-transmitting cover to render the first information to be displayed on the display surface.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
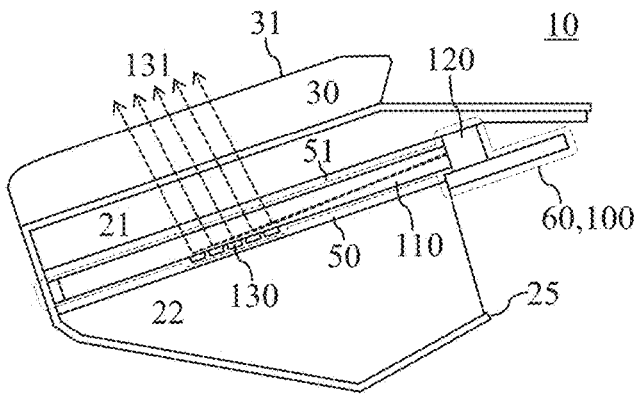
FIG. 1 is a schematic diagram illustrating the structure for the lighting assembly included in the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Most conventional automotive decorative lighting elements have used LEDs or incandescent bulbs as light sources and have directed the light to the locally translucent area below the decorative trim by direct illumination or by light guide components. The luminous pattern is completely defined by the contour of the locally translucent area on the decorative trim, which inevitably forms some locally "nontranslucent" areas. Therefore, if manufacturers intend to produce and consumers intend to see a crystal clear transparent decorative lighting component with the visual effect that a luminous pattern appears only when the light source is turned on, and the pattern becomes either faintly visible or completely invisible when the light source is turned off, this visual effect can hardly be achieved by using the conventional or the state-of-the-art automotive decorative lighting element structures.

Figure 2:
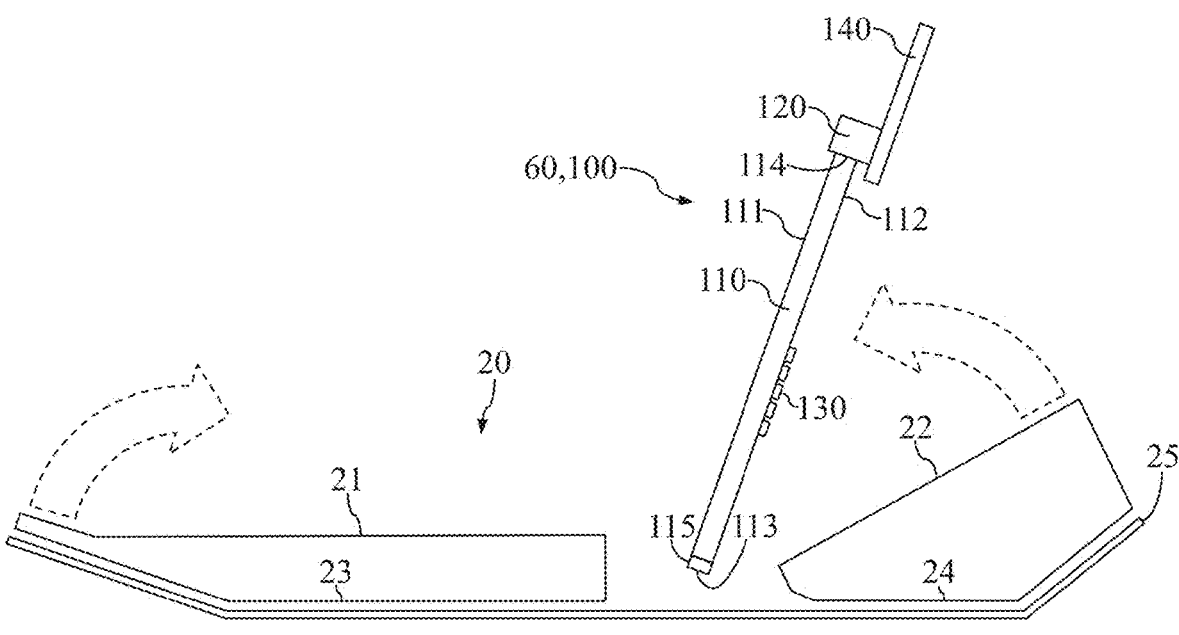
FIG. 2 is an exploded schematic diagram illustrating the decorative module and the light-emitting module included in the lighting assembly according to the present invention.

FIG. 1 is a schematic diagram illustrating the structure for the lighting assembly included in the present invention; FIG. 2 is an exploded schematic diagram illustrating the decorative module and the light-emitting module included in the lighting assembly according to the present invention. In the present embodiment, the lighting assembly 10 includes a decorative module 20, a light-transmitting cover 30, and a light-emitting information module 60, wherein the decorative module 20 includes a first decorative component 21 and a light-transmitting thin film 25. In some embodiments, the decorative module 20 further includes a second decorative component 22, which is preferably an optional component. The light-transmitting cover 30 includes a display surface 31.

The light-emitting information module 60 preferably includes a first light-emitting module 100, which includes a first light guide 110, a first light source 120, a circuit substrate 140, a first optically reflective information structure 130, and a first blackened portion 115. The first light guide 110 includes a first surface 111, a second surface 112, a third surface 113, and a fourth surface 114, wherein the first surface 111 is preferably, but not limited to, a front surface, the second surface 112 is preferably, but not limited to, a rear surface, and the third surface 113 and the fourth surface 114 are preferably, but not limited to, edge surfaces. The first optically reflective information structure 130 is preferably configured on the second surface 112, and the first blackened portion 115 is preferably configured at the position near or around the third surface 113.

The first light source 120 is preferably configured on the circuit substrate 140 and is a light source that emits light in a type of side-emitting. When the first light source 120 is activated to be lit and the first optically reflective information structure 130 is thus illuminated, the first information 131 formed thereon is displayed to render the first information 131 formed thereon appear with a luminous effect.

In some embodiments, the decorative module 20 includes a first decorative component 21 and a second decorative component 22. The first decorative component 21 and the second decorative component 22 include a first decorative component outer surface 23 and a second decorative component outer surface 24, respectively. The first decorative component 21 and the second decorative component 22 are preferably attached to the light-transmitting thin film 25 by means such as, but not limited to, adhesion through the first decorative component outer surface 23 and the second decorative component outer surface 24. In an alternative way, the first decorative component 21 and the second decorative component 22 are preferably directly formed on and attached to the light-transmitting thin film 25 by methods such as, but not limited to, insert molding or injection molding. The light-transmitting thin film 25 is made of materials preferably including, but not limited to, polycarbonate (PC), polyethylene terephthalate (PET), or other transparent materials.

Preferably, the light-transmitting thin film 25 wraps around and covers the first decorative component outer surface 23 and the second decorative component outer surface 24. During the assembly process, the first decorative component 21 and the second decorative component 22 are positioned close to each other and enclose the first surface 111, the second surface 112, and the third surface 113 on the light-emitting information module 60, thereby securing the light-emitting information module 60 in a fixed position relative to other components within the lighting assembly 10. Finally, the first decorative component 21 and the second decorative component 22 are preferably fixed to a base, which is preferably any structural component including, but not limited to, the vehicle dashboard, thereby mounting the entire lighting assembly 10 to the vehicle dashboard.

In some embodiments, the first decorative component 21 and the second decorative component 22 are preferably made in a form of a fully light-transmitting or a partially light-transmitting to ensure that when the first light-emitting module 100 is activated to be lit, the first information 131 can be displayed on the display surface 31 with a luminous effect. The first decorative component 21 and the second decorative component 22 are preferably made of light-transmitting materials, opaque materials, or a combination thereof. The light-transmitting materials preferably include, but are not limited to, plastic, glass, silicone, PC, PMMA, PET, or other materials capable of forming locally light-transmitting areas. The opaque areas on the first decorative component 21 and the second decorative component 22 are preferably formed by printing opaque materials onto the light-transmitting materials on the first decorative component 21 and the second decorative component 22, or by using dual-material injection molding with mixing of transparent and non-transparent plastics.

It is preferable to retain an ultrathin air layer 51 between the first light guide 110 and the first decorative component 21 included in the light-emitting information module 60. Likewise, an ultrathin air layer 52 is preferably formed between the first light guide 110 and the second decorative component 22. Preferably, no adhesive bonding is required for assembly between the first light guide 110 and the first decorative component 21 and between the second decorative component 22 and the light-transmitting thin film 25.

Figure 3:
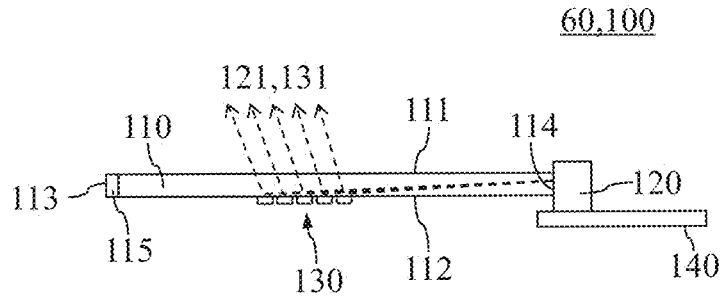
FIG. 3 is a schematic diagram illustrating the structure for the first light-emitting module included in the present invention.
Figure 4:
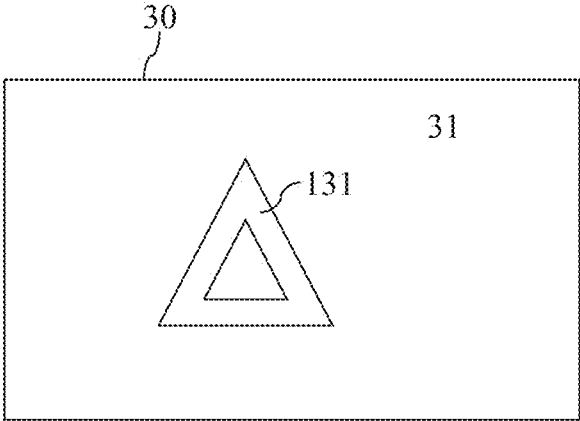
FIG. 4 is a schematic diagram illustrating the first information presented on the display surface included in the present invention.

FIG. 3 is a schematic diagram illustrating the structure for the first light-emitting module included in the present invention; FIG. 4 is a schematic diagram illustrating the first information presented on the display surface included in the present invention. The light-emitting information module 60 according to the present invention preferably includes the first light-emitting module 100.

In the present embodiment, the first light-emitting module 100 includes a first light guide 110, a first light source 120, and a circuit substrate 140, wherein the first light source 120 is configured on one side of the circuit substrate 140. When the first light source 120 is activated to be lit, it emits a first light 121, wherein the first light 121 emits colors including, but is not limited to, white, red, blue, yellow, or green.

The circuit substrate 140 is configured with control circuits and electronic components necessary to control the first light source 120 to drive and control the first light source 120, such as turning it on, turning it off, adjusting brightness, and changing color, etc. The first light source 120 is preferably a side-emitting LED component, such as a side-view LED. The first light source 120 is preferably a small size, high brightness, low power LED light source, such as, but not limited to, an SMD LED chip or a COB light source.

The first light guide 110 is preferably a light guide film (LGF). The first light guide 110 includes a first surface 111, a second surface 112, a third surface 113, and a fourth surface 114. The first surface 111 and the second surface 112 are preferably, but not limited to, the front and rear surfaces, respectively. The second surface 112 is preferably a surface opposite to the first surface 111 on the first light guide 110. The third surface 113 and the fourth surface 114 are preferably, but not limited to, the edge surfaces on the first light guide 110. Preferably, the respective areas of the third surface 113 and the fourth surface 114 are smaller than those of the first surface 111 or the second surface 112.

In order to prevent light leakage from the side edges or the edge surfaces on the first light guide 110, an opaque first blackened portion 115 is provided near or around the edge surface, such as the third surface 113 on the first light guide 110, where it is in close proximity to or in contact with the light-transmitting thin film 25. The first blackened portion 115 is preferably formed near or around the third surface 113 by methods such as, but not limited to, printing with opaque ink, ink jet printing with opaque ink, thermal transfer printing, or combinations thereof.

The first light guide 110 is preferably used to guide the first light 121 emitted from the first light source 120 to propagate to diffuse and scatter toward the first surface 111, and in the process, to convert the first light 121 from a point-light-source tendency status to a surface-light-source tendency status. The first light guide 110 is preferably made of transparent silicone, PC material, PMMA material, PET material, COP material, glass material, light guiding materials, or combinations thereof.

Preferably, the first light guide 110 includes a first optically reflective information structure 130 on the second surface 112. The first optically reflective information structure 130 is preferably formed on the second surface 112 by methods such as, but not limited to, printing with reflective ink, hot stamping, ink jet printing, hot press molding, hot stamping, laser engraving, screen printing, thermal transfer printing, steel mold embossing, etching, or combinations thereof, to alter the optical properties of the second surface 112 and increase the light reflectivity thereof in the direction toward the first surface 111.

The first optically reflective information structure 130 contains the first information 131, which is preferably color, symbols, numbers, text, patterns, or combinations thereof. When the first light source 120 is turned on to be lit, the first optically reflective information structure 130 is illuminated, and the first information 131 is thus displayed with a luminous effect. When the first light source 120 is turned off, for the first optically reflective information structure 130, in the absence of illumination, the visibility of the first information 131 thereon is reduced, which causes the first information 131 to appear blurred but still faintly visible, providing a semi-hidden or semi-concealed hazy decorative effect.

The first light 121 emitted from the first light source 120 enters the first light guide 110 via the fourth surface 114 on the first light guide 110. After being diffused and scattered by the first light guide 110, the first light 121 enters the first optically reflective information structure 130 formed on the second surface 112. Then, the light is reflected by the first optically reflective information structure 130 and emitted from the first surface 111. The first information 131 contained in the first optically reflective information structure 130 is displayed on the display surface 31 after the first light 121 passes through the light-transmitting cover 30.

Figure 5:
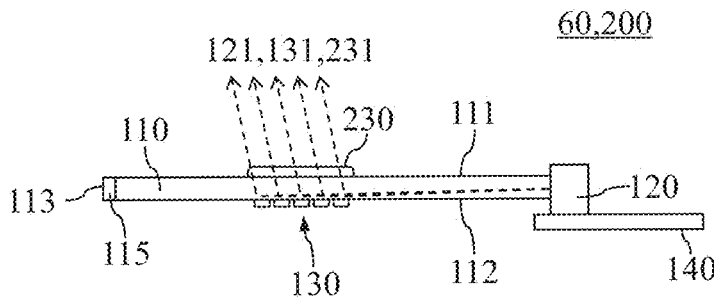
FIG. 5 is a schematic diagram illustrating the structure for the second light-emitting module included in the present invention.

FIG. 5 is a schematic diagram illustrating the structure for the second light-emitting module included in the present invention. The second light-emitting module 200 is based on the first light-emitting module 100 and includes the first light-emitting module 100. The light-emitting information module 60 according to the present invention preferably further includes the second light-emitting module 200.

In the present embodiment, the first surface 111 on the first light guide 110 included in the second light-emitting module 200 preferably further includes a second optical information structure 230. The second optical information structure 230 is preferably formed on the first surface 111 by methods such as, but not limited to, ink printing, hot stamping, ink jet printing, hot press molding, laser engraving, screen printing, thermal transfer printing, steel mold embossing, etching, or combinations thereof.

The second optical information structure 230 is preferably an artwork layer and contains second information 231, which preferably includes colors, symbols, numbers, text, patterns, or combinations thereof. When the first light source 120 is turned off, since the second optical information structure 230 is configured on the first surface 111 of the first light guide 110, the second information 231 is still faintly, hazily, or mistily visible when illuminated by ambient light. When the first light source 120 is turned on, the second optical information structure 230 is illuminated and displays the second information 231 with a luminous effect, which is then displayed on the display surface 31 after the first light 121 passes through the light-transmitting cover 30.

Figure 6:
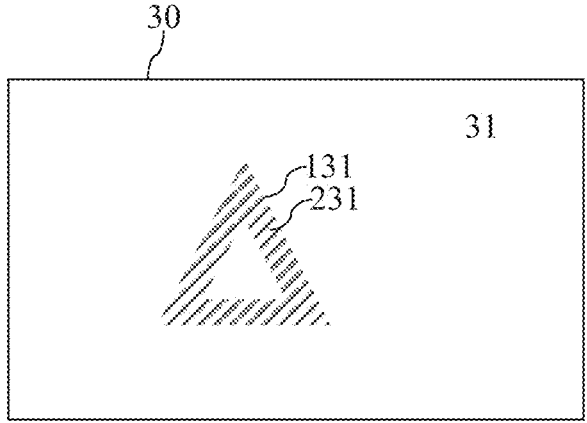
FIG. 6 is a schematic diagram illustrating the first information and the second information presented on the display surface included in the present invention.

FIG. 6 is a schematic diagram illustrating the first information and the second information presented on the display surface included in the present invention. The first optically reflective information structure 130 and the second optical information structure 230 are preferably configured to be either corresponding or non-corresponding to each other in position. Likewise, the first information 131 and the second information 231 are preferably configured to be either corresponding or non-corresponding to each other in position. The first optically reflective information structure 130 and the second optical information structure 230 have patterns that are preferably identical or different, and the first information 131 and the second information 231 have styles that are preferably identical or different.

In some embodiments, the first optically reflective information structure 130 is preferably formed as a group of densely arranged reflective dimples by steel mold embossing, and the entire group of dimples forms a hollow triangular pattern to display the first information 131. The second optical information structure 230 is preferably formed by ink jet printing with diagonal stripes, in colors such as, but not limited to, red, blue, yellow, or gray. In the present embodiment, the diagonal stripes are formed with, for example, gray color, and the entire group of illuminated gray diagonal stripes also form a hollow triangular pattern to display the second information 231.

For example, when the first optically reflective information structure 130 and the second optical information structure 230 are illuminated by the first light 121, both the first information 131 and the second information 231 are presented on the display surface 31 at the same time. It is assumed that the first information 131 and the second information 231 are correspondingly aligned and overlapped in position, with the first light 121 containing different colors, such as white, the overlapped first information 131 and the second information 231 present a luminous hollow triangular pattern formed with multiple luminous gray color diagonal stripes over a luminous white color background.

Figure 7:
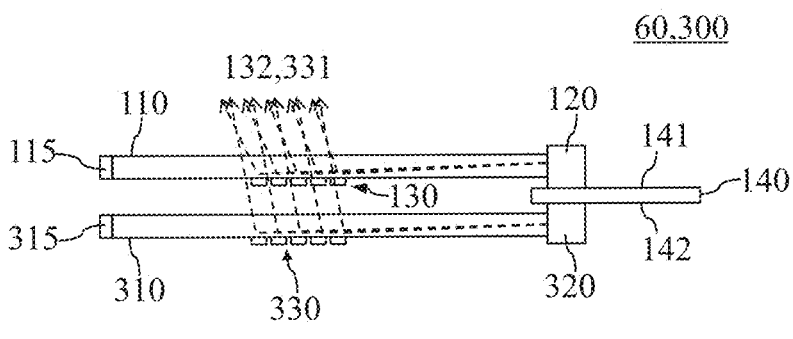
FIG. 7 is a schematic diagram illustrating the structure for the third light-emitting module included in the present invention.

FIG. 7 is a schematic diagram illustrating the structure for the third light-emitting module included in the present invention. The light-emitting information module 60 according to the present invention preferably further includes the third light-emitting module 300. The third light-emitting module 300 is based on the first light-emitting module 100 and the second light-emitting module 200 and includes the first light-emitting module 100 and the second light-emitting module 200. In the present embodiment, the third light-emitting module 300 further includes a third light guide 310 and a third light source 320. The first light guide 110 and the third light guide 310 include a first optically reflective information structure 130 and a third optically reflective information structure 330, respectively, which contain a first-type information 132 and a third-type information 331, respectively.

The first light source 120 and the third light source 320 are configured on the fifth surface 141 and the sixth surface 142, respectively, of the circuit substrate 140 and are arranged on the same side of the circuit substrate 140. The circuit substrate 140 is preferably configured to drive and control the first light source 120 and the third light source 320 individually. The first light guide 110 and the third light guide 310 are also configured on the same side on the circuit substrate 140 to guide the first light 121 and the third light 321 emitted from the first light source 120 and the third light source 320, respectively. The first light 121 and the third light 321 emit colors including, but are not limited to, white, red, blue, yellow, or green.

In order to prevent light leakage from the side edges or the edge surfaces on the third light guide 310, an opaque third blackened portion 315 is provided near or around the edge surface on the third light guide 310, where it is in close proximity to or in contact with the light-transmitting thin film 25. The third blackened portion 315 is preferably formed near or around the edge surface on the third light guide 310 by methods such as, but not limited to, printing with opaque ink, ink jet printing with opaque ink, thermal transfer printing, or combinations thereof.

Preferably, the first optically reflective information structure 130 and the third optically reflective information structure 330 are preferably configured to be either corresponding or non-corresponding to each other in position, as well as the first-type information 132 and the third-type information 331 are preferably configured to be corresponding or non-corresponding to each other in position. The first optically reflective information structure 130 and the third optically reflective information structure 330 have styles that are preferably identical or different, and the first-type information 132 and the third-type information 331 have styles that are preferably identical or different.

Figure 8:
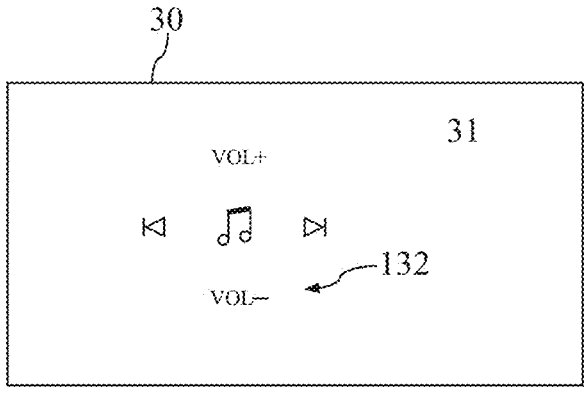
FIG. 8 is a schematic diagram illustrating the first-type information presented on the display surface included in the present invention.
Figure 9:
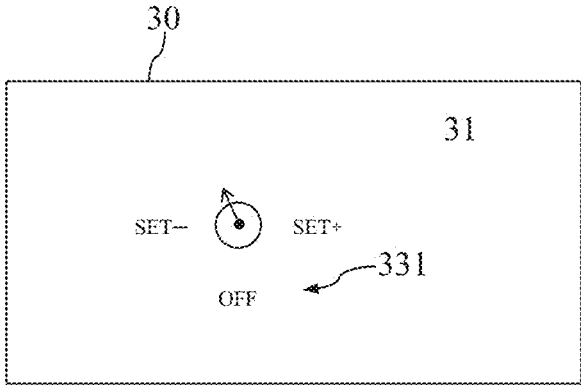
FIG. 9 is a schematic diagram illustrating the third-type information presented on the display surface included in the present invention.

FIG. 8 is a schematic diagram illustrating the first-type information presented on the display surface included in the present invention; FIG. 9 is a schematic diagram illustrating the third-type information presented on the display surface included in the present invention. In some embodiments, when only the first light source 120 is independently activated to be lit, only the first light 121 illuminates only the first optically reflective information structure 130 to present only the first-type information 132 with a luminous effect. When only the third light source 320 is independently activated to be lit, only the third light 321 illuminates only the third optically reflective information structure 330 to present only the third-type information 331 with a luminous effect.

In some embodiments, the first optically reflective information structure 130 and the third optically reflective information structure 330 are preferably configured to be non-corresponding to each other in position, and the first-type information 132 and the third-type information 331 have styles that are preferably different. The first-type information 132 preferably has a style that is a combination of text and symbols related to music, while the third-type information 331 preferably has a style that is a combination of text and symbols related to air conditioning intensity.

When only the first light source 120 is independently activated to emit the first light 121, only the first optically reflective information structure 130 is illuminated, and only the first-type information 132 with a luminous effect is independently presented on the display surface 31 included in the light-transmitting cover 30, as shown in FIG. 8. Therefore, when only the third light source 320 is independently activated to emit the third light 321, only the third optically reflective information structure 330 is illuminated, and only the third-type information 331 with a luminous effect is independently presented on the display surface 31 included in the light-transmitting cover 30, as shown in FIG. 9.

Therefore, by utilizing the light-emitting information module 60 including the light-emitting module 100, the light-emitting module 200, and the light-emitting module 300 provided by the present invention, it is possible to selectively illuminate the first optically reflective information structure 130 and the third optically reflective information structure 330 configured to be at a different position or an identical position within the same display surface 31, to selectively present or conceal either the first-type information 132 and the third-type information 331 containing different information with a luminous effect, by selectively switching the first light source 120 and the third light source 320 between activation and deactivation.

In some embodiments, the first light source 120 and the first light guide 110 collectively form a first single lighting layer, while the third light source 320 and the third light guide 310 also collectively form a second single lighting layer. It is noted that the implementation of the present invention is not limited to stacking two single lighting layers, but also covers implementations with three, four, or even more multiple stacked single lighting layers.

In some embodiments, the first light source 120 and the third light source 320 are preferably still arranged on the fifth surface 141 and the sixth surface 142 of the circuit substrate 140, respectively, but configured on different sides, such as righthand side and lefthand side, of the circuit substrate 140 in position. The first light guide 110 and the third light guide 310 are illuminated by the first light source 120 and the third light source 320 positioned on different sides, respectively. By selectively switching the first light source 120 and the third light source 320 between activation and deactivation, it is also possible to selectively illuminate either the first optically reflective information structure 130 and the third optically reflective information structure 330, at a different position or an identical position within the same display surface 31, to selectively present or conceal either the first-type information 132 and the third-type information 331 containing different information with a luminous effect.

Figure 10:
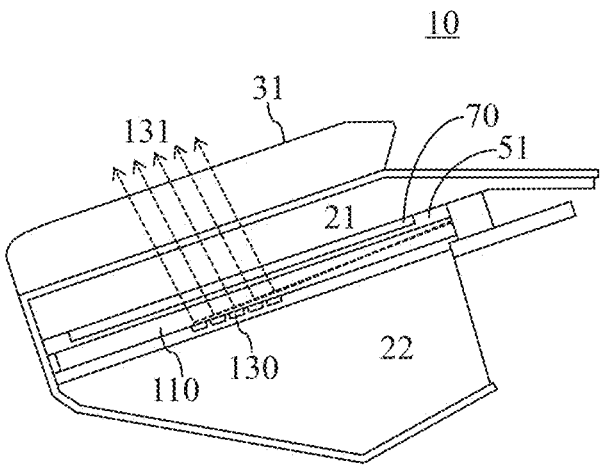
FIG. 10 is a schematic diagram illustrating the touch panel module included in the lighting assembly according to the present invention.

FIG. 10 is a schematic diagram illustrating the touch panel module included in the lighting assembly according to the present invention. In some embodiments, the lighting assembly 10 according to the present invention preferably further includes a light-transmitting touch panel module 70. The touch panel module 70 is preferably attached to the lower surface of the first decorative component 21 or configured at an suitable position between the first decorative component 21 and the first light guide 110. An air layer 51 is required to be retained between the first light guide 110 and the touch panel module 70. When a user touches the first information 131 displayed on the display surface 31, the touch panel module 70 is configured to generate a feedback signal accordingly, so as to trigger, enable, or activate various functions, such as illuminating or extinguishing a pattern in a certain part within the vehicle, or turning on or off a certain device on the vehicle, to enable the lighting assembly 10 with a touch functionality.

In summary, the present invention provides a novel light-guiding structure that integrates a transparent decorative component, a side-emitting LED, a light-guiding film (sheet), and a self-reflective pattern structure configured therebelow, so as to form a crystal clear transparent illuminated decorative trim particularly suitable for automotive interior components. The illuminated pattern on the trim appears only when the light source is activated. When the light source is turned off, the pattern becomes either faintly visible or completely indistinguishable. The self-reflective pattern structure is configured below the light-guiding film and manufactured by using methods such as printing reflective ink, mold embossing, or etching patterns on the light-guiding film. Its function is to reflect the light transmitted through the light-guiding film from the LED, allowing users to see the pattern formed by the reflective structure without using and relying on the conventional method of using a combination of locally light-transmitting area and opaque areas to define the pattern to be presented.

The assembly of the present novel light-guiding structure requires only such as but not limited to bonding or insert molding. First, the decorative thin film and the decorative component are combined by such as bonding, and then the light-guiding film module is wrapped therewith or therein, to naturally maintain and form an air gap between the light-guiding film and the upper decorative component, as well as between the light-guiding film and the lower thin film (or another decorative component). The structure prevents light from leaking from the light-guiding film toward the decorative component or the decorative thin film, thereby avoiding the light leakage phenomena.

The present invention integrates a transparent decorative component, a decorative thin film, a side-emitting LED, a light-guiding film (sheet), and a self-reflective pattern structure below it, to obtain a crystal clear transparent illuminated decorative trim. The illuminated pattern on the trim appears only when the light source is activated. When the light source is off, the pattern is either faintly visible or completely indistinguishable. Furthermore, in addition to being transparent on both the front surface and the rear surface, the decorative trim has at least one transparent surface, preferably the surface facing the consumer, covered with a decorative thin film, so as to achieve a crystal-like transparent visual effect.

The present invention is a novel design for, for example, but not limited to, a transparent film touch button that is intended to present a front view that appears as a single piece of transparent glass with no visible internal layered structure. The primary structure includes, from top to bottom: a transparent PC film, a first plastic component, a light guide module, and a second plastic component (optional). The transparent PC film (or decorative thin film) is the most important component that is capable of creating a visual optical effect so that users are visually unable to see the internal layered structure, thereby presenting an overall one-piece transparent visual effect. The PC film is directly molded to form the outer appearance for the product. The first plastic component is primarily used for protection and fixation, while the second plastic component is optional. It is necessary to maintain a small gap between the PC film and the plastic components, and the product should not be assembled by adhesive scheme. The side edges on the light guide module are selectively blackened to prevent light leakage; however, some consumers may prefer the aesthetic feeling provided by the light leakage effect.

The present invention further provides the advantages as follows: (1) forming a crystal clear transparent illuminated trim wherein the illuminated pattern appears only when the light source is activated and the pattern is either faintly visible or completely indistinguishable when the light source is turned off; (2) utilizing a light-guiding film design to conserve and save module space and reduce module weight; (3) being compatible with multiple layers of light-guiding films in combination with different reflective light patterns, enabling diverse decorative and control applications and scenarios; (4) in addition to being transparent on both the front and rear surfaces, having at least one side (typically the side facing the consumer) with a crystal-like transparent visual effect; and (5) reducing power consumption.

There are further embodiments provided as follows.

Embodiment 1: A lighting assembly includes: a first decorative component; a light-transmitting thin film attached to the first decorative component; and a first light guide configured adjacent to the first decorative component and including a first optically reflective information structure attached to the first light guide and including a first information and a first light source emitting a first light, wherein the first light illuminates the first optically reflective information structure and penetrates through the first decorative component and the light-transmitting thin film to render the first information to be displayed on a display surface, when the first light source is activated.

Embodiment 2: The lighting assembly according to Embodiment 1, further includes one of the following: a decorative module including the first decorative component and the light-transmitting thin film, wherein the light-transmitting thin film is attached to the first decorative component; a light-transmitting cover configured adjacent to the light-transmitting thin film and including the display surface; and a light-emitting information module including a first light-emitting module, wherein the first light-emitting module includes: the first light guide including a first surface, a second surface, a third surface, and a fourth surface; the first light source configured on a circuit substrate and to emit the first light; the first optically reflective information structure configured on the second surface and including the first information and a first-type information; and a touch panel module configured below the first decorative component, wherein the first light enters from the fourth surface to illuminate the first optically reflective information structure and penetrates through the first decorative component, the light-transmitting thin film, and the light-transmitting cover to render the first information to be displayed on the display surface.

Embodiment 3: The lighting assembly according to Embodiment 2, the decorative module further includes a second decorative component, and the first decorative component and the second decorative component include a first decorative component outer surface and a second decorative component outer surface, respectively, wherein the light-transmitting thin film is attached to the first decorative component outer surface and the second decorative component outer surface.

Embodiment 4: The lighting assembly according to Embodiment 2, the light-emitting information module further includes: a second light-emitting module, including: the first light guide including a second optical information structure configured on the first surface, wherein the second optical information structure including a second information.

Embodiment 5: The lighting assembly according to Embodiment 4, the first information and the second information are configured to overlap or not overlap in position and to be identical or different in pattern.

Embodiment 6: The lighting assembly according to Embodiment 4, the light-emitting information module further includes: a third light-emitting module, including: a third light guide including a third optically reflective information structure including a third-type information; and a third light source emitting a third light to illuminate the third optically reflective information structure.

Embodiment 7: The lighting assembly according to Embodiment 6, the first-type information and the third-type information are configured to overlap or not overlap in position and to be identical or different in pattern.

Embodiment 8: The lighting assembly according to Embodiment 6, the first optically reflective information structure, the second optical information structure, and the third optically reflective information structure are formed by one of a printing ink, a hot stamping, an ink jet printing, a hot press molding, a laser engraving, a screen printing, a thermal transfer printing, a steel mold embossing, an etching, and a combination thereof.

Embodiment 9: The lighting assembly according to Embodiment 4, the first information and the second information include one of a color, a symbol, a number, a text, a pattern, and a combination thereof.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A lighting assembly, comprising:

a first decorative component;

a light-transmitting thin film attached to the first decorative component; and a first light guide configured adjacent to the first decorative component and comprising a first optically reflective information structure attached to the first light guide and comprising a first information and a first light source emitting a first light, wherein the first light illuminates the first optically reflective information structure and penetrates through the first decorative component and the light-transmitting thin film to render the first information to be displayed on a display surface, when the first light source is activated, wherein the lighting assembly further comprises:

a light-emitting information module comprising a first light-emitting module, wherein the first light-emitting module comprises:

the first light guide comprising a first surface, a second surface, a third surface, and a fourth surface;

the first light source configured on a circuit substrate and to emit the first light;

the first optically reflective information structure configured on the second surface and comprising the first information and a first-type information; and a touch panel module configured below the first decorative component, wherein the first light enters from the fourth surface to illuminate the first optically reflective information structure and penetrates through the first decorative component, the light-transmitting thin film, and a light-transmitting cover adjacent to the light transmitting thin film to render the first information to be displayed on the display surface.

2. The lighting assembly according to claim 1, wherein the decorative module further comprises a second decorative component, and the first decorative component and the second decorative component comprise a first decorative component outer surface and a second decorative component outer surface, respectively, wherein the light-transmitting thin film is attached to the first decorative component outer surface and the second decorative component outer surface.

3. The lighting assembly according to claim 1, wherein the light-emitting information module further comprises:

a second light-emitting module, comprising:

the first light guide comprising a second optical information structure configured on the first surface, wherein the second optical information structure comprising a second information.

4. The lighting assembly according to claim 3, wherein the first information and the second information are configured to overlap or not overlap in position and to be identical or different in pattern.

5. The lighting assembly according to claim 3, wherein the light-emitting information module further comprises:

a third light-emitting module, comprising:

a third light guide comprising a third optically reflective information structure comprising a third-type information; and a third light source emitting a third light to illuminate the third optically reflective information structure.

6. The lighting assembly according to claim 5, wherein the first-type information and the third-type information are configured to overlap or not overlap in position and to be identical or different in pattern.

7. The lighting assembly according to claim 5, wherein the first optically reflective information structure, the second optical information structure, and the third optically reflective information structure are formed by one of a printing ink, a hot stamping, an ink jet printing, a hot press molding, a laser engraving, a screen printing, a thermal transfer printing, a steel mold embossing, an etching, and a combination thereof.

8. The lighting assembly according to claim 3, wherein the first information and the second information comprise one of a color, a symbol, a number, a text, a pattern, and a combination thereof.

* * * * *